United States Patent
Fujiwara et al.

(10) Patent No.: US 11,298,770 B2
(45) Date of Patent: Apr. 12, 2022

(54) ARC WELDING METHOD AND ARC WELDING DEVICE

(71) Applicant: Panasonic Intellectual Property Management Co., Ltd., Osaka (JP)

(72) Inventors: Junji Fujiwara, Osaka (JP); Yuya Furuyama, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 489 days.

(21) Appl. No.: 16/338,129

(22) PCT Filed: Oct. 10, 2017

(86) PCT No.: PCT/JP2017/036595
§ 371 (c)(1),
(2) Date: Mar. 29, 2019

(87) PCT Pub. No.: WO2018/070364
PCT Pub. Date: Apr. 19, 2018

(65) Prior Publication Data
US 2019/0270156 A1     Sep. 5, 2019

(30) Foreign Application Priority Data

Oct. 11, 2016 (JP) .............................. JP2016-199633

(51) Int. Cl.
*B23K 9/073*   (2006.01)
*B23K 9/09*    (2006.01)
(Continued)

(52) U.S. Cl.
CPC .......... *B23K 9/0738* (2013.01); *B23K 9/0035* (2013.01); *B23K 9/073* (2013.01);
(Continued)

(58) Field of Classification Search
CPC ...... B23K 9/0956; B23K 9/173; B23K 9/124; B23K 9/09; B23K 9/125; B23K 9/0735;
(Continued)

(56) References Cited

U.S. PATENT DOCUMENTS

2005/0269306 A1    12/2005 Fulmer et al.
2009/0127242 A1*    5/2009 Aimi .................... B23K 9/0731
                                                       219/137 PS
(Continued)

FOREIGN PATENT DOCUMENTS

EP    2 862 661      4/2015
JP    1-266966       10/1989
(Continued)

OTHER PUBLICATIONS

International Search Report dated Dec. 5, 2017 in International (PCT) Application No. PCT/JP2017/036595.
(Continued)

*Primary Examiner* — Brian W Jennison
(74) *Attorney, Agent, or Firm* — Wenderoth, Lind & Ponack, L.L.P.

(57) ABSTRACT

An arc welding method alternately generates a short-circuit state and an arc state. In the method, short circuits are generated also in the arc period. This more than doubles the total number of short circuits, which is the sum of the short circuits generated in the short circuit period and those generated in the arc period. This enables a thin plate to be arc welded at a higher speed, while reducing its burn-through.

14 Claims, 7 Drawing Sheets

(51) Int. Cl.
*B23K 9/10* (2006.01)
*B23K 9/12* (2006.01)
*B23K 9/00* (2006.01)
*B23K 9/095* (2006.01)

(52) U.S. Cl.
CPC ............ *B23K 9/092* (2013.01); *B23K 9/0953* (2013.01); *B23K 9/1043* (2013.01); *B23K 9/12* (2013.01); *B23K 9/124* (2013.01)

(58) Field of Classification Search
CPC ...... B23K 9/067; B23K 9/1043; B23K 9/092; B23K 9/0738; B23K 9/12; B23K 9/093; B23K 9/1031; B23K 9/1062
See application file for complete search history.

(56) References Cited

U.S. PATENT DOCUMENTS

| | | | |
|---|---|---|---|
| 2012/0097654 A1* | 4/2012 | Kawamoto | B23K 9/067 219/125.1 |
| 2012/0145691 A1 | 6/2012 | Fujiwara et al. | |
| 2012/0255940 A1* | 10/2012 | Fujiwara | B23K 9/1012 219/137 R |
| 2015/0041449 A1* | 2/2015 | Fujiwara | B23K 9/095 219/130.21 |
| 2016/0346864 A1 | 12/2016 | Matsui et al. | |
| 2017/0225253 A1* | 8/2017 | Matsuoka | B23K 9/09 |
| 2019/0084068 A1 | 3/2019 | Furuyama et al. | |

FOREIGN PATENT DOCUMENTS

| | | |
|---|---|---|
| JP | 2011-098375 | 5/2011 |
| JP | 2014-226708 | 12/2014 |
| JP | 2015-157304 | 9/2015 |
| JP | 2016-22507 | 2/2016 |
| JP | 2016-147312 | 8/2016 |
| WO | 2011/013305 | 2/2011 |
| WO | 2013/190746 | 12/2013 |
| WO | 2015/122144 | 8/2015 |
| WO | 2017/169899 | 10/2017 |

OTHER PUBLICATIONS

Communication pursuant to Article 94(3) EPC dated Oct. 22, 2020 in corresponding European Patent Application No. 17860382.5.

* cited by examiner

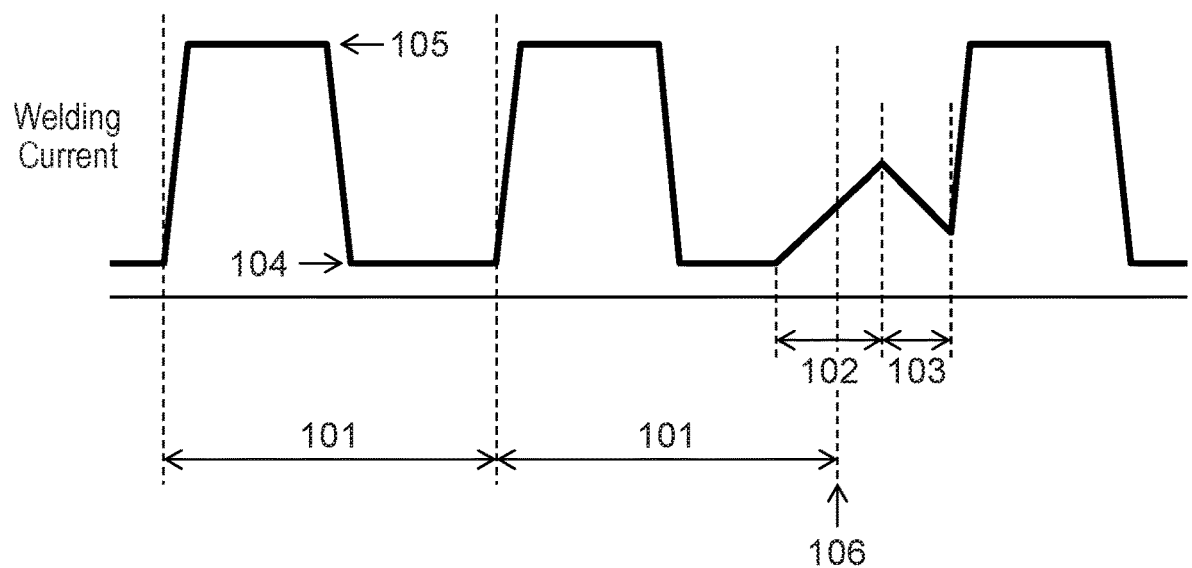
FIG. 7 - PRIOR ART

ARC WELDING METHOD AND ARC WELDING DEVICE

TECHNICAL FIELD

The present invention relates to a method and device for arc welding in which a welding wire as a consumable electrode is fed in alternating forward and backward directions to generate a short-circuit state and an arc state alternately.

BACKGROUND ART

There is a growing demand in the welding industry for higher welding speed and less spattering to improve productivity. An increase in welding speed can boost the production per unit time, whereas the reduction of spattering can shorten the treatment for removing spatters adhered to the workpiece, thereby achieving higher welding productivity.

In the conventional control of the pulse welding output, a first period, which is the basic pulse period, starts with the output of a pulse current. When a second period shorter than the first period passes, if a short circuit is released and an arc is present between the welding wire and the base material as the object-to-be-welded, the next pulse current is outputted in the basic pulse period.

On the other hand, if a short circuit is present when the second period passes, a welding current lower than the rising speed of the pulse current is outputted. When the short circuit is released, a welding current lower than the pulse current and higher than the base current is outputted for a predetermined period of time. Subsequently, the next pulse current is outputted. This is how the spattering is reduced (e.g., Patent Literature 1).

The pulse current output controlled by the above-described conventional arc welding device will be described with reference to FIG. 7. FIG. 7 shows a current waveform obtained under the conventional current control using this pulsed arc welding device. FIG. 7 includes a basic pulse period 101, a short circuit period 102 in which the welding wire and the base material are short circuited, and an arc initial time (period) 103 in which the tip of the welding wire is melted into a lump to achieve the droplet transfer after the short circuit is released.

According to the conventional pulsed arc welding device, when a short circuit occurs, pulse control by a pulse waveform circuit is placed in a standby state, and short-circuit control by a dip waveform circuit is given priority to perform waveform control. In the current waveform shown in FIG. 7, at a pulse start timing 106 in the second basic pulse period 101, the short circuit is present. Hence, the short-circuit control is continued in the short circuit period 102 until the short circuit is released.

After the short circuit is released, in order to melt the tip of the welding wire into a lump to achieve the droplet transfer, a welding current lower than a peak current 105 of the pulse current and higher than base current 104 is outputted during the arc initial time 103. When the arc initial time 103 passes, the pulse current is applied. This is how the spattering is reduced.

CITATION LIST

Patent Literature

PTL 1: Japanese Unexamined Patent Application Publication No. 1-266966

SUMMARY

Technical Problem

Increasing the welding current to increase the welding speed may cause defective welds. In order to prevent this problem and/or in order to reduce burn-through when the object-to-be-welded is a thin plate, the welding voltage can be lowered. However, the lowered voltage increases the short circuit duration (the time from the start of a short circuit until it is released), and also increases the current, and hence, spattering when the short circuit is released.

An object of the present invention is to provide a method and device for arc welding capable of welding a thin plat as the object-to-be-welded at a high speed while reducing its burn-through.

Solution to Problem

An aspect of the arc welding method according to the present invention is an arc welding method in which short-circuiting and arcing are generated alternately, the method including: upon detection of the release of a short circuit in a short circuit period, applying, in an arc period which is a composite arc period including a first arc period and a second arc period, the following currents: a first current having a peak value higher than a value of the current observed when the short circuit is released; and a second current lower than the first current, and having a peak value lower than the value of the current observed when the short circuit is released; and generating a short circuit between the first arc period and the second arc period in the composite arc period, the first arc period and the second arc period being included in a period including a falling period in which the first current is reduced to the second current and a second current period in which the second current is applied.

Another aspect of the arc welding method according to the present invention is an arc welding method in which short-circuiting and arcing are generated alternately, the method including; upon detection of the predictor of the release of a short circuit in a short circuit period, reducing a welding current observed when the predictor is detected to a lower current; upon detection of the release of the short circuit in the short circuit period, applying, in an arc period which is a composite arc period including a first arc period and a second arc period, the following currents: a first current having a peak value higher than a value of the welding current observed when the predictor is detected, and a second current lower than the first current, and lower than the value of the welding current observed when the predictor is detected, the second current having a peak value higher than the lower current; and generating a short circuit between the first arc period and the second arc period, the first arc period and the second arc period being included in a period including a falling period in which the first current is reduced to the second current and a second current period in which the second current is applied.

When a short circuit is generated in the period including the falling period and the second current period in the composite arc period, the second current may be maintained throughout the second current period by preventing the current waveform from having an abrupt change due to the short circuit in a short circuit period in which the short circuit is generated in the composite arc period.

When the short circuit is generated in the period including the falling period and the second current period, a short-circuit current may be gradually increased with a predetermined slope from the detection of the short circuit until the detection of the release of the short circuit.

Upon detection of the predictor of the release of the short circuit in the period including the falling period and the second current period, the welding current observed when the predictor is detected may be reduced to a lower current, and upon detection of the release of the short circuit in the period including the falling period and the second current period, the second current may be applied at a constant value in the second arc period.

In both aspects of the arc welding method, a welding wire may be fed in alternating forward and backward directions.

The feeding of the welding wire is performed periodically at a predetermined cycle and amplitude.

The feeding of the welding wire is aperiodically performed in the backward direction when the welding state is detected to be in a short-circuit state, and in the forward direction when the welding state is detected to be in an arc state.

In the feeding of the welding wire, the welding wire may be fed in the forward direction throughout the short circuit period occurring between the first arc period and the second arc period.

An aspect of the arc welding device according to the present invention is an arc welding device in which short-circuiting and arcing are generated alternately, the device including: a primary rectifier configured to rectify received electric power; a switching unit configured to convert the output of the primary rectifier into alternating current; a transformer configured to transform the output of the switching unit; a secondary rectifier configured to rectify the output of the transformer; a driver configured to control the switching unit; a welding voltage detector configured to detect a welding voltage; a short circuit-arc detector configured to determine, based on the output of the welding voltage detector, whether the welding state is in a short-circuit state or in an arc state; a short circuit controller configured to control the welding output in the short-circuit state; and an arc controller configured to control the welding output in the arc state, wherein when the short circuit-arc detector detects that the welding state has made a transition from the short-circuit state to the arc state, the arc controller applies the following currents in an arc period which is a composite arc period including a first arc period and a second arc period: a first current having a peak value higher than a value of the current observed when the short circuit is released; and a second current lower than the first current, and having a peak value lower than the value of the current observed when the short circuit is released, a short circuit is generated between the first arc period and the second arc period in the composite arc period, the first arc period and the second arc period being included in a period including a falling period in which the first current is reduced to the second current and a second current period in which the second current is applied.

Another aspect of the arc welding device according to the present invention is an arc welding device in which short-circuiting and arcing are generated alternately, the device including: a primary rectifier configured to rectify received electric power; a switching unit configured to convert the output of the primary rectifier into alternating current; a transformer configured to transform the output of the switching unit; a secondary rectifier configured to rectify the output of the transformer; a driver configured to control the switching unit; a welding voltage detector configured to detect a welding voltage; a short circuit-arc detector configured, based on the output of the welding voltage detector, to determine whether the welding state is in a short-circuit state or in an arc state, and to detect the predictor of a transition from the short-circuit state to the arc state; a short circuit controller configured to control the welding output in the short-circuit state; and an arc controller configured to control the welding output in the arc state, wherein upon detection of the predictor of the release of a short circuit, the short circuit controller reduces a welding current observed when the predictor is detected to a lower current, when the short circuit-arc detector detects the release of the short circuit, the arc controller applies the following currents in an arc period which is a composite arc period including a first arc period and a second arc period: a first current having a peak value higher than a value of the welding current observed when the predictor is detected; and a second current lower than the first current, and lower than the value of the welding current observed when the predictor is detected, the second current having a peak value higher than the lower current, a short circuit is generated between the first arc period and the second arc period in the composite arc period, the first arc period and the second arc period being included in a period including a falling period in which the first current is reduced to the second current and a second current period in which the second current is applied.

Both aspects of the above-described arc welding device may further include a wire feed controller configured to control feeding of a welding wire, wherein the welding wire is fed in alternating forward and backward directions.

Advantageous Effects of Invention

As described above, according to the aspects of the present invention, in an arc welding method in which a short-circuit state and an arc state are generated alternatively, short circuits are generated in the arc period. This can more than double the total number of short circuits, which is the sum of the short circuits generated in the short circuit period and those generated in the arc period. This enables a thin plate as the object-to-be-welded to be arc welded at a higher speed, while reducing its burn-through.

BRIEF DESCRIPTION OF DRAWINGS

FIG. 7 shows the waveform of a welding current according to the conventional arc welding method.

DESCRIPTION OF EMBODIMENTS

A method and device for arc welding with a consumable electrode according to the exemplary embodiments of the present invention will now be described as follows with reference to the drawings.

First Exemplary Embodiment

In the first exemplary embodiment, an arc welding method will be described first, followed by an arc welding device implementing the arc welding method.

Figure 1:
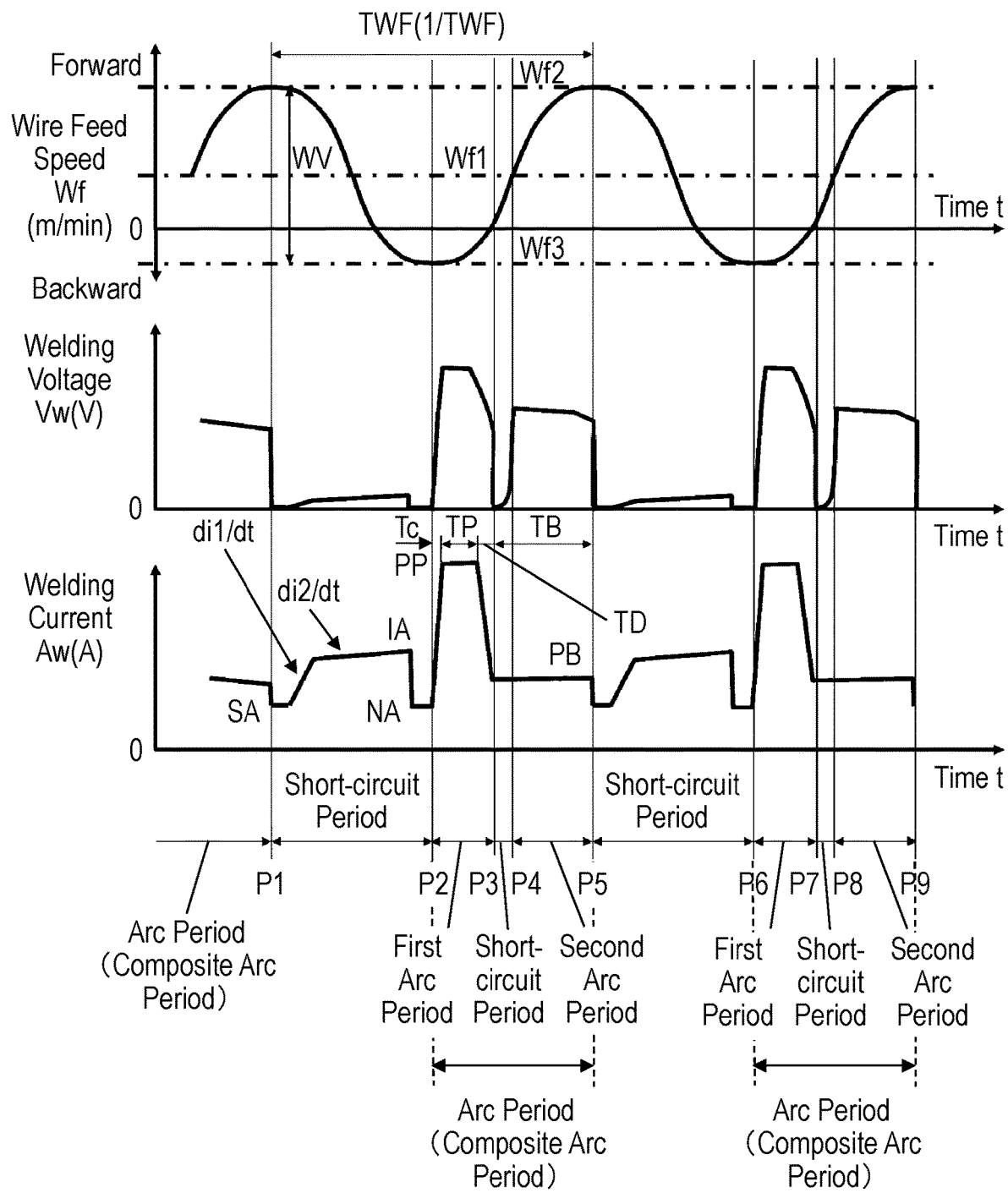
FIG. 1 shows the waveforms of a wire feed speed (in the forward and backward directions periodically in the form of a sine wave), a welding voltage, and a welding current in a first exemplary embodiment of the present invention.

FIG. 1 shows the waveforms of a wire feed speed Wf, a welding voltage Vw, and a welding current Aw in the consumable electrode arc welding in which a short-circuit state and an arc state are generated alternately.

First of all, the feed control of a welding wire in the present exemplary embodiment will be described with reference to FIG. 1. As shown in FIG. 1, the wire is fed in the forward and backward directions periodically in the form of a sine wave based on the following conditions: a predetermined wire feed speed Wf1, a predetermined cycle TWF, a predetermined frequency (1/TWF), and a predetermined velocity amplitude WV.

Thus, regardless of whether the welding process is in the short-circuit state or in the arc state, the wire is fed in the forward and backward directions periodically in the form of the sine wave. At the peak of the wire feed speed in the forward direction, a short circuit occurs around a time point P1. At the peak of the wire feed speed in the backward direction, an arc occurs around a time point P2. At the peak of the wire feed speed in the forward direction subsequent to the time point P2, another short circuit occurs around a time point P5.

The period between the time points P1 and P5 is one control cycle. The period between the time points P1 and P2 is a short circuit period. The period between the time points P2 and P5 is an arc period. These periods are repeated to perform welding. Feeding the wire in the forward direction promotes a short circuit, and feeding it in the backward direction promotes the release of the short circuit. Thus, the generation of the short-circuit state and the arc state basically depends on the wire feed control of feeding the wire in the forward and backward directions periodically.

Next, the welding control in the present exemplary embodiment will be descried as follows with reference to FIG. 1.

The time point P1 is when a short circuit begins. From the time point P1 onward, a short-circuit initial current SA is outputted for a predetermined period of time. Subsequently, the short-circuit current is increased with a first-stage increase slope di1/dt (increase in current per unit time). Next, the short-circuit current is increased with a second-stage increase slope di2/dt (increase in current per unit time) gentler than the first-stage increase slope di1/dt.

Before the time point P2, a droplet neck is detected. The droplet neck is formed between the tip of welding wire 20 and the melt pool in object-to-be-welded 25 as the release of the short circuit approaches. Upon detection of the neck as the predictor of the release of the short circuit, a current IA, which is observed when the neck is detected, is instantaneously decreased to a neck current NA in order to reduce spattering when the short circuit is released.

The time point P2 is when the short-circuit state is replaced by the arc state because the droplet neck comes off the tip of wire 20 and the droplet is transferred to object-to-be-welded 25 to release the short circuit. During the arc period starting at the time point P2, a first current PP with a peak value higher than the current observed when the short circuit is released is outputted for a first current period TP. The first current PP is then replaced by a second current PB. The second current PB is lower than the first current PP, lower than the current IA observed when the neck as the predictor of the transition from the short-circuit state to the arc state is detected, and higher than the neck current NA reduced from the current IA. The first current PP is replaced by the second current PB at a time point P3.

The period between the time points P2 and P5 is the arc period. The arc period is a composite arc period including a first arc period and a second arc period. The first arc period covers between the time points P2 and P3. The period between the time points P3 and P4 is the short circuit period which is included in the arc period and in which a short circuit is generated. The second arc period covers between the time points P4 and P5.

In the composite arc period, another short circuit is generated at the time point P3, when the first arc period is replaced by the short circuit period. The short circuit is released at the time point P4, when the short circuit period is replaced by the second arc period. In order to generate a short circuit regularly at the time point P3, the optimum droplet should be grown at the tip of wire 20 at the first current PP in the first current period TP. The optimum values vary depending on the material of wire 20 and the type of the shielding gas.

In the short circuit period and the second arc period of the composite arc period, the second current PB is continued. The optimum droplet is grown at the first current PP in the first current period TP such that the droplet is formed into a teardrop shape immediately before coming off the tip of wire 20 onto object-to-be-welded 25. As a result, when a short circuit occurs, the droplet is absorbed by the surface tension of the melt pool so that the short circuit can be released quickly. This enables reducing spattering in the droplet transfer without the need of applying a high short-circuit current to prompt the release of the short circuit.

It is alternatively possible to prompt the next short circuit by accelerating the growth of the droplet by, for example, fluctuating the current in the form of pulses in a second current period TB. This approach, however, may disrupt the short-circuit cycle due to variations in the droplet growth. For this reason, if welding stability has a higher priority, it is better to continue the second current PB.

The second current PB is further continued between the time points P4 and P5. In other words, after replacing the first current PP, the second current PB is maintained during the second current period TB, which covers between the time points P3 and P5. As a result, the second current PB is maintained throughout the second current period TB including the period between the time points P3 and P4 during which the short circuit is present and the period between the time points P4 and P5 during which the short circuit is released. In other words, even when a short circuit occurs while the first current PP is being replaced by the second current PB after the occurrence of an arc, the current waveform is maintained. This prevents the current waveform from having an abrupt change due to the short circuit in the short circuit period in which the short circuit is generated. In short, the current has substantially the same change rate before and after the short circuit. At the time point P5, the composite arc period is replaced by the short circuit period. In spite that a short circuit occurs during the composite arc period, the current waveform is maintained to reduce current fluctuation. This more than doubles the total number of short circuits, which is the sum of the short circuits generated in the short circuit period and those generated in the arc period. This enables a thin plate as the object-to-be-welded to be arc welded at a higher speed, while reducing its burn-through. The time point P5 is when the next short circuit occurs after the previous short circuit occurs at the time point P1. At the time point P5, the welding process is in the same state as at the time point P1. Thus, short circuits and arcs are generated alternately to achieve welding.

Before the time point P2, upon detection of the droplet neck as the predictor of the release of the short circuit, the current IA is instantaneously decreased to the neck current NA so as to reduce spattering when the short circuit is released. However, the primary objective of the present exemplary embodiment is to more than double the number of short circuits. If spattering does not matter, the detection of the neck is not necessary. In other words, the current does not have to be decreased before the time point P2.

When wire 20 is made of aluminum or bronze, the detection of the neck is not necessary because decreasing the current IA instantaneously to the neck current NA does not greatly contribute to the reduction of spattering.

In such a case, upon detection of the release of the short circuit in the short circuit period covering between the time points P1 and P2, it is possible to apply the first current PP and the second current PB during the arc period (the composite arc period). The first current PP has a peak value higher than the current observed when the short circuit is released. The second current PB is lower than the first current PP and has a peak value lower than the current observed when the short circuit is released.

In the composite arc period, a short circuit is preferably generated in a period including a falling period TD in which the first current PP is reduced to the second current PB and the second current period TB. In the present exemplary embodiment, the short circuit is generated in the second current period TB, but may alternatively be generated in the falling period TD.

Figure 2:
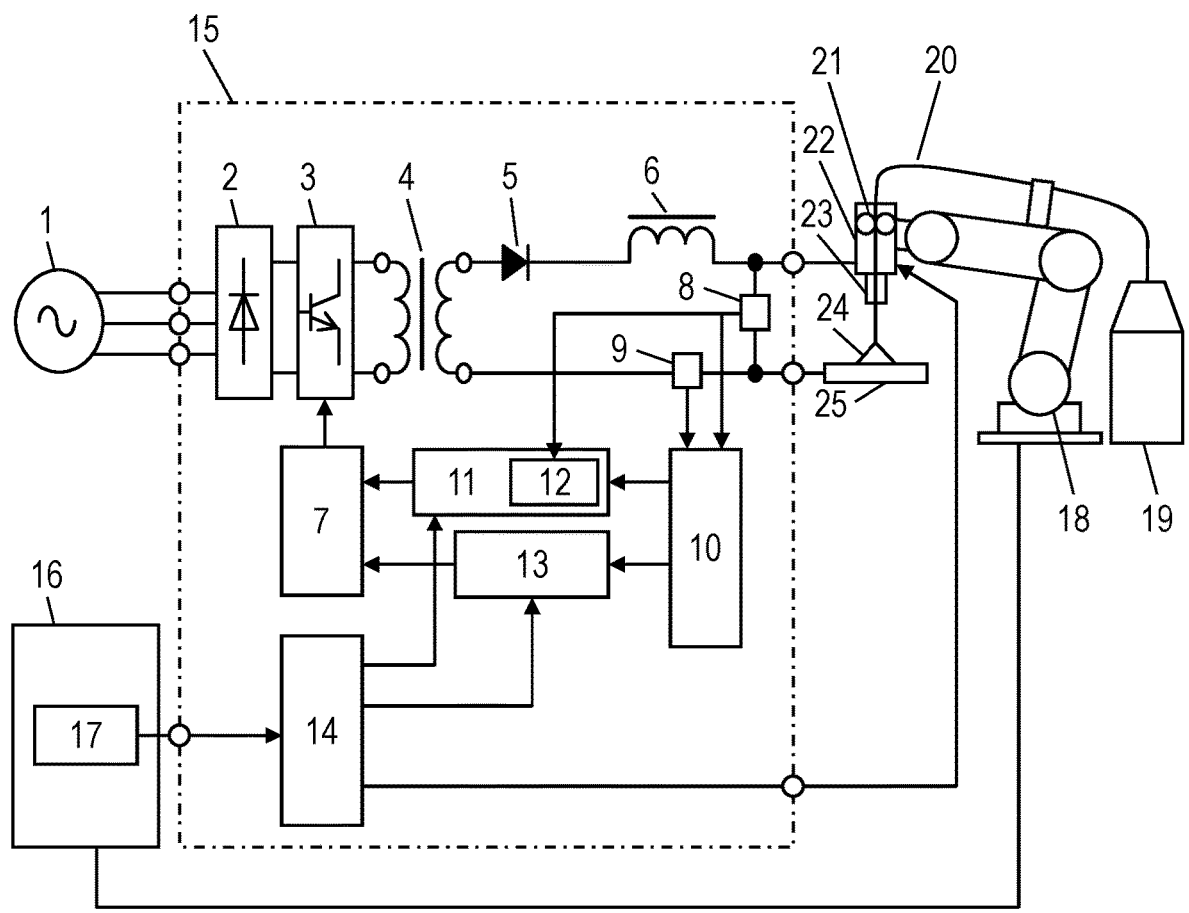
FIG. 2 is a schematic configuration view of an arc welding device according to the first exemplary embodiment of the present invention.

Next, the arc welding device implementing the above-described arc welding method according to the present exemplary embodiment will be described with reference to FIG. 2. FIG. 2 is a schematic configuration view of the arc welding device.

The arc welding device mainly includes the following components: welding power supply device 15; manipulator 18; robot controller 16 for controlling manipulator 18; and torch 22 attached to manipulator 18 and including feed rollers 21 to feed wire 20 and welding tip 23.

In FIG. 2, device 15 includes the following components: primary rectifier 2 for rectifying the electric power received from input power 1; switching unit 3 for converting the output of primary rectifier 2 into the alternating current; transformer 4 for stepping down the output of switching unit 3; secondary rectifier 5 for rectifying the output of transformer 4; DCL 6 as an inductance; and driver 7 for controlling switching unit 3.

Device 15 further includes the following components: welding voltage detector 8 connected between the output terminals of welding power supply device 15 so as to detect a welding voltage; welding current detector 9 for detecting a welding output current; and short circuit-arc detector 10 for detecting, based on the signal from welding voltage detector 8, whether a short-circuit state in which wire 20 and object-to-be-welded 25 are short circuited, or an arc state in which an arc exists between them.

Device 15 further includes the following components: short circuit controller 11 for controlling the short-circuit current in the short circuit period upon receipt of a signal indicative of the short-circuit state from detector 10; arc controller 13 for controlling an arc voltage in the composite arc period upon receipt of a signal indicative of the arc state from detector 10; neck controller 12 disposed in short circuit controller 11; and wire feed controller 14 for controlling the feeding of wire 20. Short circuit-arc detector 10 also has the function of detecting, based on the output of welding voltage detector 8, a neck as the predictor of the transition from the short-circuit state to the arc state.

The output of device 15 is applied between object-to-be-welded 25 and wire 20, which is drawn out of wire storage 19 and passes through welding tip 23. As a result, arc 24 is generated between wire 20 and object-to-be-welded 25.

Robot controller 16 includes programmed current setting unit 17 for setting the programmed current, which is an average welding current. The output of unit 17 is supplied to wire feed controller 14.

Short circuit-arc detector 10 may detect whether the welding process is in the short-circuit state or in the arc state based either on the signal from welding current detector 9 or on both the signal from welding voltage detector 8 and the signal from welding current detector 9.

Short circuit controller 11 makes driver 7 control the welding output in the short circuit period upon receiving the signal indicative of the short circuit period from short circuit-arc detector 10.

Arc controller 13 makes driver 7 control the welding output in the composite arc period upon receiving the signal indicative of the arc period from short circuit-arc detector 10.

Before the time point P2, neck controller 12 disposed in short circuit controller 11 detects a droplet neck. The droplet neck is formed between the tip of wire 20 and the melt pool in object-to-be-welded 25 as the release of the short circuit approaches. Upon detection of the neck as the predictor of the release of the short circuit, the current IA is instantaneously decreased to the neck current NA in order to reduce spattering when the short circuit is released. To achieve the instantaneous decrease, neck controller 12 determines and controls a neck detection parameter suitable to each programmed current set by programmed current setting unit 17.

The arc welding device of the present exemplary embodiment with the above structure operates as follows. Upon detection of the transition from the short-circuit state to the arc state, the first current PP and the second current PB are applied during the composite arc period. The first current PP has a peak value higher than the current observed when the short circuit is released. The second current PB is lower than the first current PP and has a peak value lower than the current observed when the short circuit is released. A short circuit is generated in the period including the falling period TD and the second current period TB.

The arc welding device with such a structure according to the present exemplary embodiment operates as follows. Upon detection of the neck as the predictor of the release of the short circuit, the current IA is decreased to the neck current NA. Upon detection of the release of the short circuit, the first current PP and the second current PB are applied during the composite arc period. The first current PP has a peak value higher than the current IA observed when the predictor is detected. The second current PB is lower than the first current PP, lower than the current IA observed when the predictor is detected, having a peak value higher than the current observed when the short circuit is released, and higher than the neck current NA reduced from the current IA. A short circuit is generated in the period including the falling period TD and the second current period TB.

The short circuit is generated in the period including the falling period TD and the second current period TB so as to achieve droplet transfer. In this case, the wire feed speed Wf with the sinusoidal waveform as shown in FIG. 1 is preferably within the range between a wire feed speed Wf3, which is at the transition from the backward to the forward direction, and the predetermined wire feed speed Wf1, which is the average wire feed speed as the reference.

As shown in FIG. 1, the wire is preferably fed in the forward direction during the short circuit period that occurs between the first arc period and the second arc period.

Figure 3:
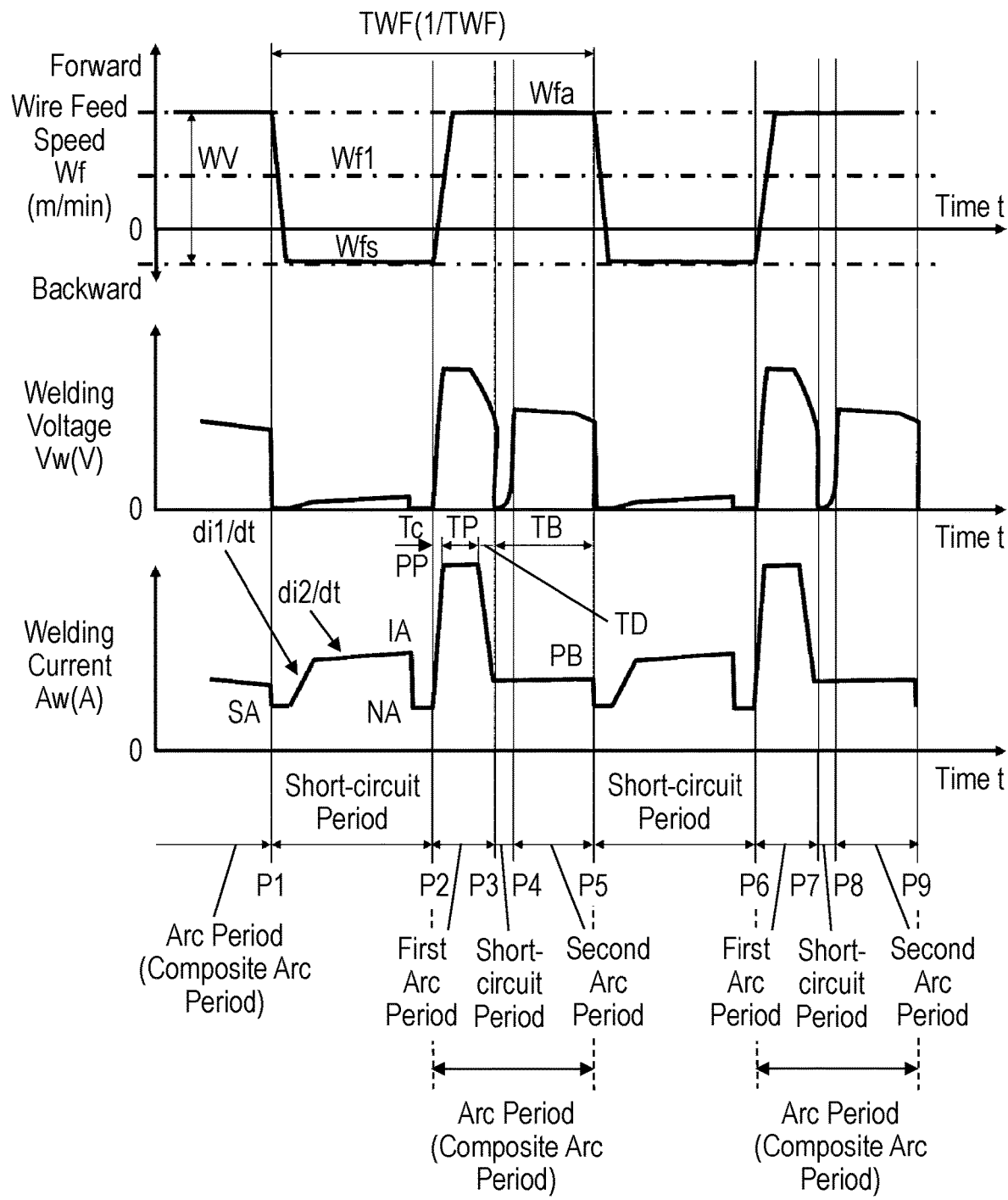
FIG. 3 shows the waveforms of a wire feed speed (in the forward and backward directions periodically in the form of a trapezoid), a welding voltage, and a welding current in the first exemplary embodiment of the present invention.
Figure 4:
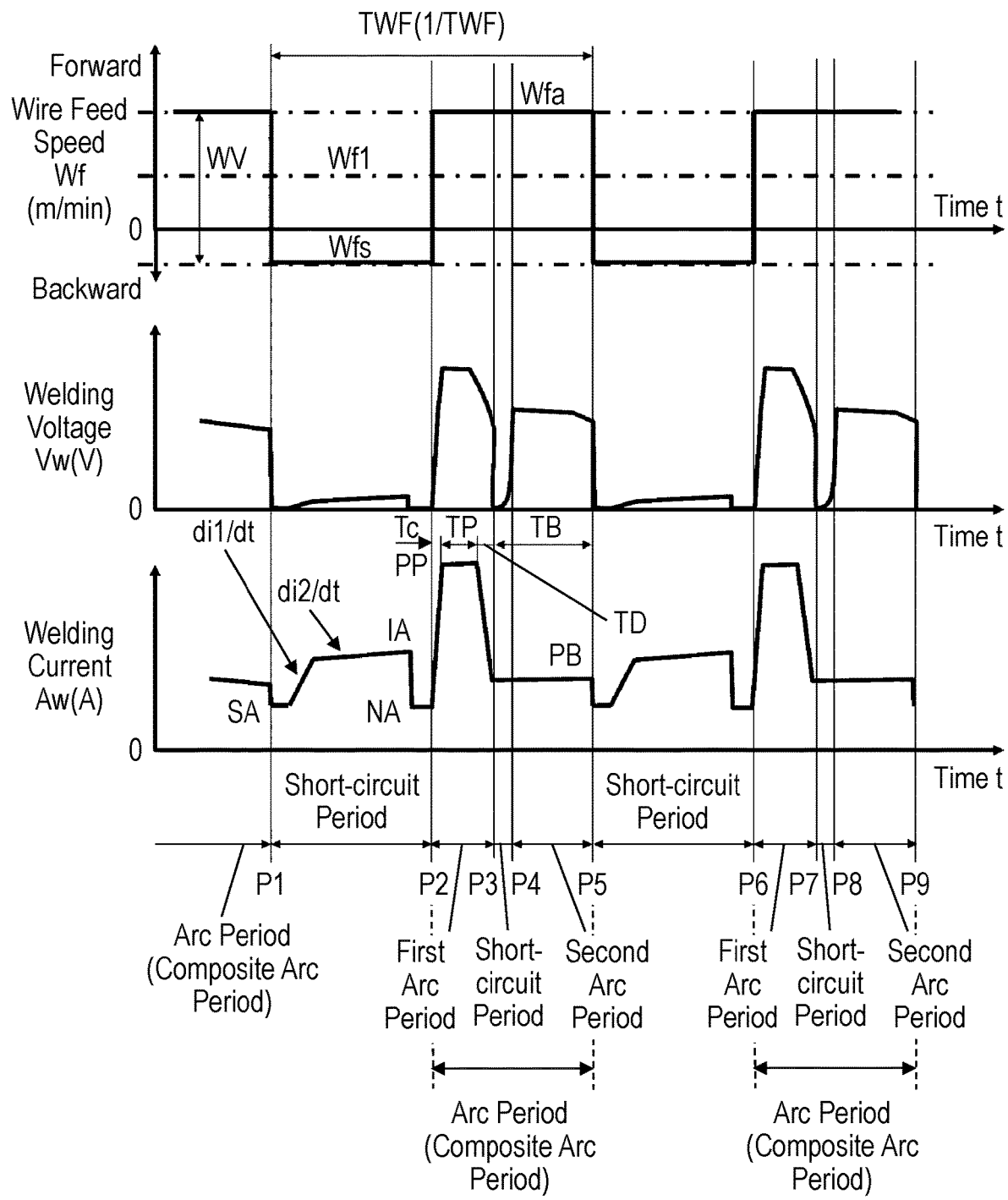
FIG. 4 shows the waveforms of a wire feed speed (in the forward and backward directions periodically in the form of a rectangle based on the determination of whether a short-circuit state or an arc state), a welding voltage, and a welding current in the first exemplary embodiment of the present invention.

The waveform of the wire feed speed Wf may be trapezoidal as shown in FIG. 3 or rectangular as shown in FIG. 4. In this case, the preferable timings to generate a short circuit in the period including the falling period TD and the second current period TB to achieve droplet transfer are around the middle of the period occurred at a wire forward-feed speed Wfa. At these time points around the middle of the period, the droplet with a teardrop shape grown at the wire tip comes into contact with the melt pool in object-to-be-welded 25, and the droplet can make a smooth short-circuit transfer to the melt pool.

In the above description, the wire feed speed is changed sinusoidally as shown in FIG. 1; however, similar effects can be obtained when the speed is changed trapezoidally as shown in FIG. 3.

Instead of the periodic feed control, non-periodic feed control can be performed by switching the wire feed between the forward and backward directions depending on whether a short circuit is generated or released as shown in FIG. 4.

To be more specific, upon detection of a short-circuit state, the wire forward-feed speed Wfa is replaced by a wire backward-feed speed Wfs. Subsequently, the wire is fed in the backward direction in the short circuit period. Meanwhile, upon detection of an arc state, the wire backward-feed speed Wfs is replaced by the wire forward-feed speed Wfa. As a result, the wire is fed in the forward direction in a rising period TC of the first current PP, the first current period TP, and the second current period TB of the composite arc period. In the feed control shown in FIG. 4, the welding process is in the short-circuit state during the short circuit period of the composite arc period; however, the wire forward-feed speed Wfa is maintained. Thus, similar effects can be obtained by feeding wire 20 in the forward direction in the falling period TD and the short circuit period included in the second current period TB of the composite arc period. Upon detection of the short-circuit state, the wire forward-feed speed Wfa may be replaced by the wire backward-feed speed Wfs in the short circuit period of the composite arc period.

In the above-described method and device for arc welding in which a short-circuit state and an arc state are generated alternately, unlike pulse welding, the arc can be stable even when the welding voltage is decreased to weld a thin plate as object-to-be-welded 25 at a high speed and a high welding current.

According to the conventional arc welding method described in Patent Literature 1 with reference to FIG. 7, if the welding speed is increased (e.g., 1.5 m/min or more) at as high a welding current as 200 to 300 A (amperes), the welding voltage should be decreased to prevent undercut or humping. However, decreasing the welding voltage to reduce burn-through of the object-to-be-welded with a thickness t of 1.6 mm or less will increase the short circuit duration (the time from the start of a short circuit until it is released), and will also increase the current when the short circuit is released. This results in an increase in spattering when the short circuit is released. Furthermore, as the programmed current is set higher (e.g., 300 A), the pulse waveform has a higher frequency and a shorter base period. As a result, although the basic pulse period 101 has a high current region, the short circuit is less likely to be released, prolonging the short circuit duration. This causes a delay in the next pulse start timing, failing to fully melt the welding wire fed at the programmed welding current, thereby causing an unstable arc. These problems have been solved by the method and device for arc welding according to the present exemplary embodiment.

Second Exemplary Embodiment

A second exemplary embodiment will now be described with reference to FIGS. 5 to 6. In this exemplary embodiment, like components are labeled with like reference numerals with respect to the first exemplary embodiment, and these components are not described again in detail.

Similar to the first exemplary embodiment, in the second exemplary embodiment, a short circuit is generated in the period including the falling period TD and the second current period TB of the composite arc period. In the falling period TD, the first current PP is reduced to the second current PB lower than the peak value of the first current PP. The present exemplary embodiment differs from the first exemplary embodiment as follows. In the short circuit period of the composite arc period, when a droplet neck is detected, which is the predictor of the release of the short circuit and is also the predictor of the transition from the short-circuit state to the arc state, the current (IA2 in FIG. 5 or IA3 in FIG. 6) is reduced to the neck current (NA2 in FIG. 5 or NA3 in FIG. 6), respectively. Subsequently, upon detection of the release of the short circuit, the second current PB higher than the neck current (NA2, NA3) is applied during the composite arc period.

Figure 5:
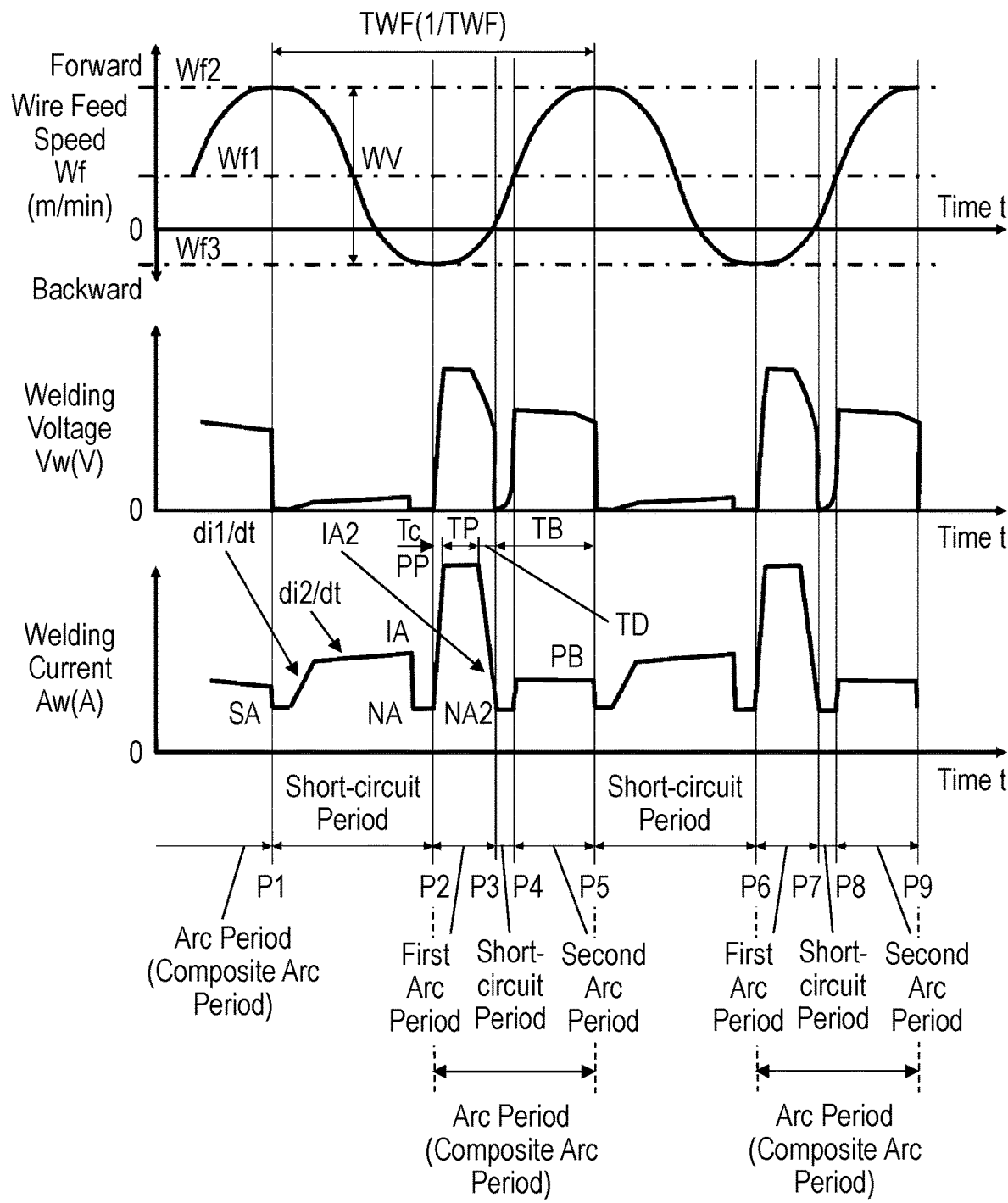
FIG. 5 shows the waveforms of a wire feed speed (in the forward and backward directions periodically in the form of a sine wave), a welding voltage, and a welding current in a second exemplary embodiment of the present invention.
Figure 6:
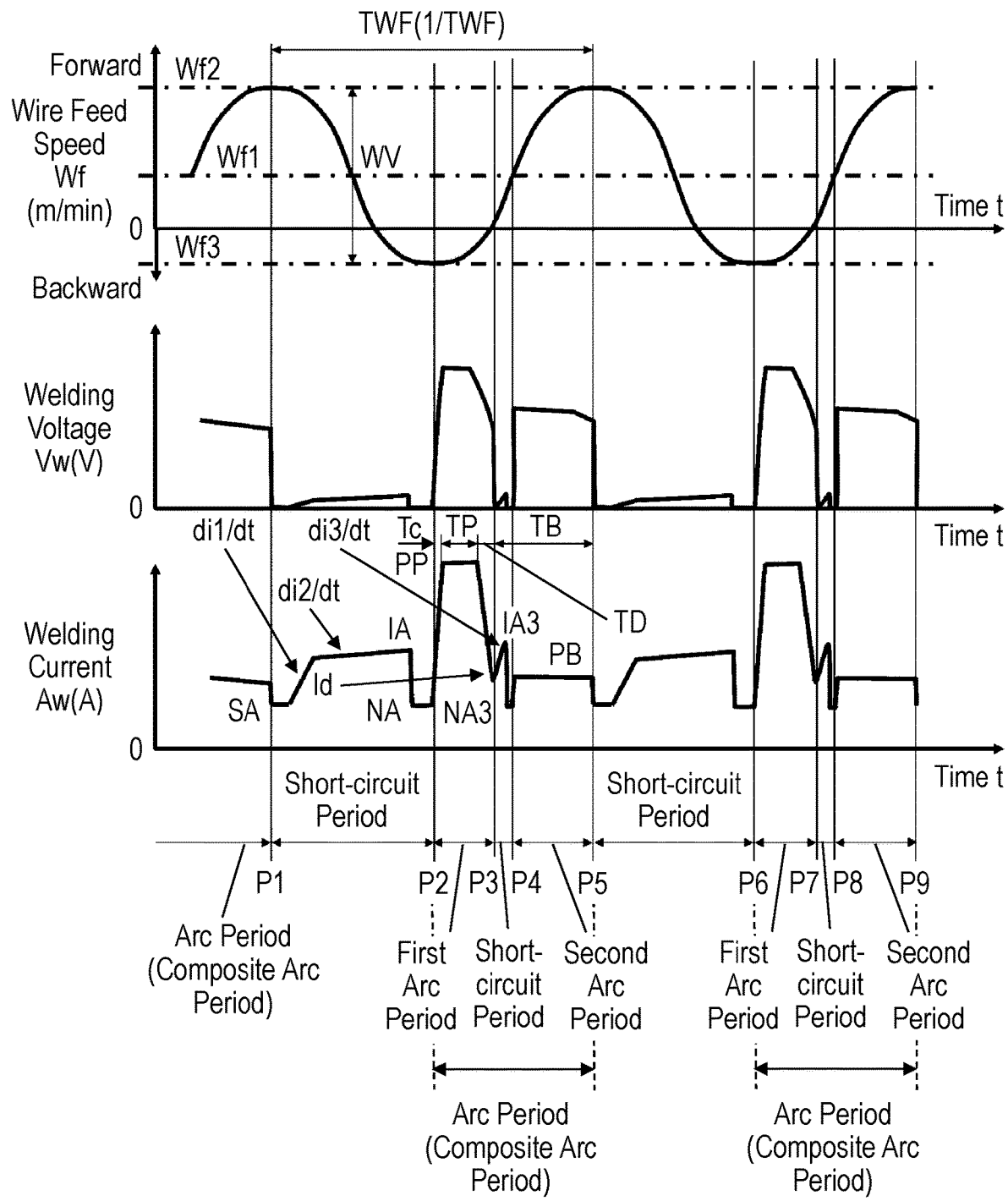
FIG. 6 shows the waveforms of a wire feed speed (in the forward and backward directions periodically in the form of a sine wave), a welding voltage, and a welding current in the second exemplary embodiment of the present invention.

The neck current NA observed immediately before the time point P2, the neck current NA2 observed at the time point P3 in FIG. 5, and the neck current NA3 observed at the time point P4 in FIG. 6 may have the same value.

This method of controlling arc welding will now be described with reference to FIG. 5.

The time point P1 is when a short circuit begins. From the time point P1 onward, a short-circuit initial current SA is outputted for a predetermined period of time. Subsequently, the short-circuit current is increased with a first-stage increase slope di1/dt (increase in current per unit time). Next, the short-circuit current is increased with a second-stage increase slope di2/dt (increase in current per unit time) gentler than the first-stage increase slope di1/dt.

Before the time point P2, a droplet neck is detected. The droplet neck is formed between the tip of welding wire 20 and the melt pool in object-to-be-welded 25 as the release of the short circuit approaches. Upon detection of the neck as the predictor of the release of the short circuit, a current IA, which is observed when the neck is detected, is instantaneously decreased to a neck current NA in order to reduce spattering when the short circuit is released.

The time point P2 is when the short-circuit state is replaced by the arc state because the droplet neck comes off the tip of wire 20 and the droplet is transferred to object-to-be-welded 25 to release the short circuit. At the time point P2 which is immediately after the release of the shirt circuit, or in other words, immediately after the occurrence of an arc, the first current PP is outputted for the first current period TP. Subsequently, the first current PP is replaced by the second current PB at the time point P3. Another short circuit is generated at the time point P3 and is released at the time point P4 in the composite arc period. In order to generate a short circuit regularly at the time point P3, the optimum droplet should be grown at the tip of wire 20 at the first current PP in the first current period TP. The optimum values vary depending on the material of wire 20 and the type of the shielding gas.

The second current PB is lower than the first current PP, lower than the current IA observed when the predictor is detected before the time point P2, has a peak value higher than the current observed when the short circuit is released, and higher than the neck current NA reduced from the current IA when the predictor is detected.

In the composite arc period, upon detection of the neck as the predictor of the release of the short circuit at the time point P3, which is before the time point P4 when another short circuit is generated, a welding current IA2 is instantaneously decreased to the neck current NA2 so as to reduce spattering when the short circuit is released.

As described above, the second current PB is lower than the first current PP, lower than the current IA observed when the predictor is detected before the time point P2, has a peak value higher than the current observed when the short circuit is released, and higher than the neck current NA reduced from the current IA when the predictor is detected. In addition to, or instead of this, the second current PB may be lower than the current IA observed when the predictor is detected and may be higher than the neck current NA2.

When two short circuits occur; one before the time point P2 and the other before the time point P4 within one short-circuit cycle, the current is instantaneously decreased to the neck current NA and the neck current NA2. This can more than double the number of short circuits and reduce spattering at the same time. In the first exemplary embodiment, the current waveform is prevented from having an abrupt change due to the short circuit during the short circuit period of the composite arc period. In the first exemplary embodiment, the programmed current is in the middle or high current region exceeding 200 A, and may increase spattering if the second current PB exceeds 100 A. Meanwhile, in the second exemplary embodiment, the neck current NA2 in the short circuit period of the composite arc period is not more than 100 A. This achieves the reduction of spattering.

It would be possible to reduce the welding current to as low as the neck current NA without the detection of the neck; however, the reduction would not be performed securely and timely.

As shown in FIG. 6, the short-circuit current may be increased with a predetermined slope di3/dt between the time points P3 and P4. This enables the droplet to be absorbed by the surface tension of the melt pool in object-to-be-welded 25 during a short circuit so as to prompt the removal of the droplet neck from the wire tip.

For example, when the programmed current is in the low current region such as 100 A or below, the second current PB is not more than 50 A. This makes the short circuit less likely to release. In such a case, the short-circuit current can be increased with the predetermined slope di3/dt to facilitate the release of the short circuit.

To be more specific, in order to largely reduce the welding voltage, it is useful to prompt the removal of the droplet neck from the wire tip. For example, the optimum droplet can be grown at the first current PP in the first current period TP. The droplet outgrown the diameter of wire 20 is formed into a teardrop shape immediately before falling into the melt pool. However, even if appropriately grown, the droplet may not be absorbed by the surface tension of the melt pool in object-to-be-welded 25 during a short circuit. In such a case, the welding voltage may be largely lowered to reduce spattering.

In the above case, when a short circuit occurs in the period including the falling period TD and the second current period TB, the release of the short circuit can be accelerated as follows. Preferably, a short-circuit current that gradually increases with the predetermined slope di3/dt from a current Id observed when the short circuit is detected can be applied until the release of the short circuit.

Subsequently, upon detection of the predictor of the release of the short circuit, the current IA3 is instantaneously decreased to the neck current NA3. Next, upon detection of the release of the short circuit, during the composite arc period, the second current PB is applied, which is lower than the first current PP, lower than the current IA3 observed when the predictor is detected, and higher than the neck current NA3 reduced from the current IA3.

In addition to, or instead of this, the second current PB may be lower than the current IA observed when the predictor is detected and may be higher than the neck current NA.

The time point P5 is when the next short circuit occurs after the previous short circuit occurs at the time point P1. At the time point P5, the welding process is in the same state as at the time point P1. Thus, short circuits and arcs are generated alternately to achieve welding.

The arc welding device of the present exemplary embodiment mainly differs from that of the first exemplary embodiment as follows. Neck controller 12 disposed in short circuit controller 11 detects the droplet neck, which is formed between the tip of wire 20 and the melt pool in object-to-be-welded 25 as the release of the short circuit approaches, not only before the time point P2 but also before the time point P4 (see FIGS. and 6). Upon detection of the neck as the predictor of the release of the short circuit, the current (IA2, IA3) is instantaneously decreased to the neck current (NA2, NA3) in order to reduce spattering when the short circuit is released. To achieve the instantaneous decrease, neck controller 12 determines and controls a neck detection parameter suitable to each programmed current set by programmed current setting unit 17.

The current IA observed when the neck as the predictor of the release of the short circuit is detected before the time point P2 (before the first arc period) may be either the same as or different from the currents IA2 and IA3 observed before the time point P4 (before the second arc period). Furthermore, the neck current NA observed before the first arc period may be either the same as or different from the neck currents NA2 and NA3 observed before the second arc period. The neck current can be varied over the low and high current regions of the programmed current, before and in the middle of the composite arc period (between the first arc period and the second arc period). This can more than double the total number of short circuits, which is the sum of the short circuits generated in the short circuit period and those generated in the composite arc period. This enables a thin plate as the object-to-be-welded to be arc welded at a higher speed.

The above-described method and device for arc welding provide a welding method in which a short-circuit state and an arc state are generated alternately. Unlike pulse welding in which droplet short-circuit transfer is achieved by reducing the welding voltage to increase the welding speed, this method stabilizes the arc and reduces spattering even when the welding voltage is decreased to weld a thin plate as the object-to-be-welded at a high speed and at a high welding current.

INDUSTRIAL APPLICABILITY

According to the present invention, in the method of arc welding in which a short-circuit state and an arc state are generated alternately, short circuits are generated in the arc period as well as in the short circuit period. This more than doubles the total number of short circuits, which is the sum of the short circuits generated in the short circuit period and those generated in the arc period. Thus, the method and device for arc welding enables a thin plate as the object-to-be-welded to be welded at a higher speed.

REFERENCE MARKS IN THE DRAWINGS 1 input power
2 primary rectifier
3 switching unit
4 transformer
5 secondary rectifier
6 DCL
7 driver
8 welding voltage detector
9 welding current detector
10 short circuit-arc detector
11 short circuit controller
12 neck controller
13 arc controller
14 wire feed controller
15 welding power supply device
16 robot controller
17 programmed current setting unit
18 manipulator
19 wire storage
20 welding wire
21 torch
22 feed roller
23 welding tip
24 arc
25 object-to-be-welded

The invention claimed is:

1. An arc welding method in which short-circuiting and arcing are generated alternately, the method comprising:
   upon detection of a release of a short circuit in a short circuit period, applying, in an arc period which is a composite arc period comprising a first arc period and a second arc period, following currents:
      a first current having a peak value higher than a value of a current observed when the short circuit is released, and
      a second current lower than the first current, and having a peak value lower than the value of the current observed when the short circuit is released;
   generating a short circuit between the first arc period and the second arc period in the composite arc period, the first arc period and the second arc period being included in a period comprising a falling period in which the first current is reduced to the second current and a second current period in which the second current is applied; and
   feeding a welding wire in alternating forward and backward directions.

2. An arc welding method in which short-circuiting and arcing are generated alternately, the method comprising:
   upon detection of a predictor of a release of a short circuit in a short circuit period, reducing a welding current observed when the predictor is detected to a lower current;
   upon detection of the release of the short circuit in the short circuit period, applying, in an arc period which is a composite arc period comprising a first arc period and a second arc period, following currents:
      a first current having a peak value higher than a value of the welding current observed when the predictor is detected, and
      a second current lower than the first current, and lower than the welding current observed when the predictor is detected, the second current having a peak value higher than the welding current which is reduced to the lower current when the predictor is detected;
   generating a short circuit between the first arc period and the second arc period in the composite arc period, the first arc period and the second arc period being included in a period comprising a falling period in which the first current is reduced to the second current and a second current period in which the second current is applied; and
   feeding a welding wire in alternating forward and backward directions.

3. The arc welding method according to claim 1, further comprising:
   when the short circuit is generated in the period comprising the falling period and the second current period in the composite arc period, maintaining the second current throughout the second current period by preventing a current waveform from having an abrupt change due to the short circuit in a short circuit period in which the short circuit is generated in the composite arc period.

4. The arc welding method according to claim 1, further comprising:
   when the short circuit is generated in the period comprising the falling period and the second current period, gradually increasing a short-circuit current with a predetermined slope from detection of the short circuit until detection of a release of the short circuit.

5. The arc welding method according to claim 4, further comprising:
   upon detection of the predictor of a release of the short circuit in the period comprising the falling period and the second current period, reducing the welding current observed when the predictor is detected to a lower current, and
   upon detection of the release of the short circuit in the period comprising the falling period and the second current period, applying the second current at a constant value in the second arc period.

6. The arc welding method according to claim 1, wherein the feeding of the welding wire is performed periodically at a predetermined cycle and amplitude.

7. The arc welding method according to claim 1, the feeding of the welding wire is aperiodically performed:

in the backward direction when a welding state is detected to be in a short-circuit state, and in the forward direction when the welding state is detected to be in an arc state.

8. The arc welding method according to claim 1, wherein in the feeding of the welding wire, the welding wire is fed in the forward direction throughout a short circuit period occurring between the first arc period and the second arc period.

9. The arc welding method according to claim 2, further comprising:

when the short circuit is generated in the period comprising the falling period and the second current period in the composite arc period, maintaining the second current throughout the second current period by preventing a current waveform from having an abrupt change due to the short circuit in a short circuit period in which the short circuit is generated in the composite arc period.

10. The arc welding method according to claim 2, further comprising:

when the short circuit is generated in the period comprising the falling period and the second current period, gradually increasing a short-circuit current with a predetermined slope from detection of the short circuit until detection of a release of the short circuit.

11. The arc welding method according to claim 2, further comprising:

upon detection of the predictor of a release of the short circuit in the period comprising the falling period and the second current period, reducing the welding current observed when the predictor is detected to a lower current, and upon detection of the release of the short circuit in the period comprising the falling period and the second current period, applying the second current at a constant value in the second arc period.

12. The arc welding method according to claim 2, wherein the feeding of the welding wire is performed periodically at a predetermined cycle and amplitude.

13. The arc welding method according to claim 2, the feeding of the welding wire is aperiodically performed:

in the backward direction when a welding state is detected to be in a short-circuit state, and in the forward direction when the welding state is detected to be in an arc state.

14. The arc welding method according to claim 2, wherein in the feeding of the welding wire, the welding wire is fed in the forward direction throughout a short circuit period occurring between the first arc period and the second arc period.

\* \* \* \* \*